A. E. SMAILL.
MIXING AND TREATING APPARATUS.
APPLICATION FILED JAN. 15, 1915.

1,178,957.

Patented Apr. 11, 1916.
2 SHEETS—SHEET 1.

INVENTOR
A. E. SMAILL.

WITNESSES

BY

ATT'YS.

A. E. SMAILL.
MIXING AND TREATING APPARATUS.
APPLICATION FILED JAN. 15, 1915.

1,178,957.

Patented Apr. 11, 1916.
2 SHEETS—SHEET 2.

WITNESSES

INVENTOR
A. E. SMAILL

BY

ATT'YS.

UNITED STATES PATENT OFFICE.

ALBERT EDWARD SMAILL, OF OTTAWA, ONTARIO, CANADA.

MIXING AND TREATING APPARATUS.

1,178,957. Specification of Letters Patent. Patented Apr. 11, 1916.

Application filed January 15, 1915. Serial No. 2,404.

*To all whom it may concern:*

Be it known that I, ALBERT EDWARD SMAILL, a subject of the King of Great Britain, and resident of the city of Ottawa, in the Province of Ontario, Dominion of Canada, have invented certain new and useful Improvements in Mixing and Treating Apparatus, of which the following is the specification.

This invention relates to improvements in mixing and treating apparatus, and the objects of the invention are to provide a simple and effective form of apparatus in which any desired chemical or physical continuous treatment may be given to a solid material and it consists essentially of the improved construction hereinafter described in detail in the accompanying specification and drawings.

Figure 1:
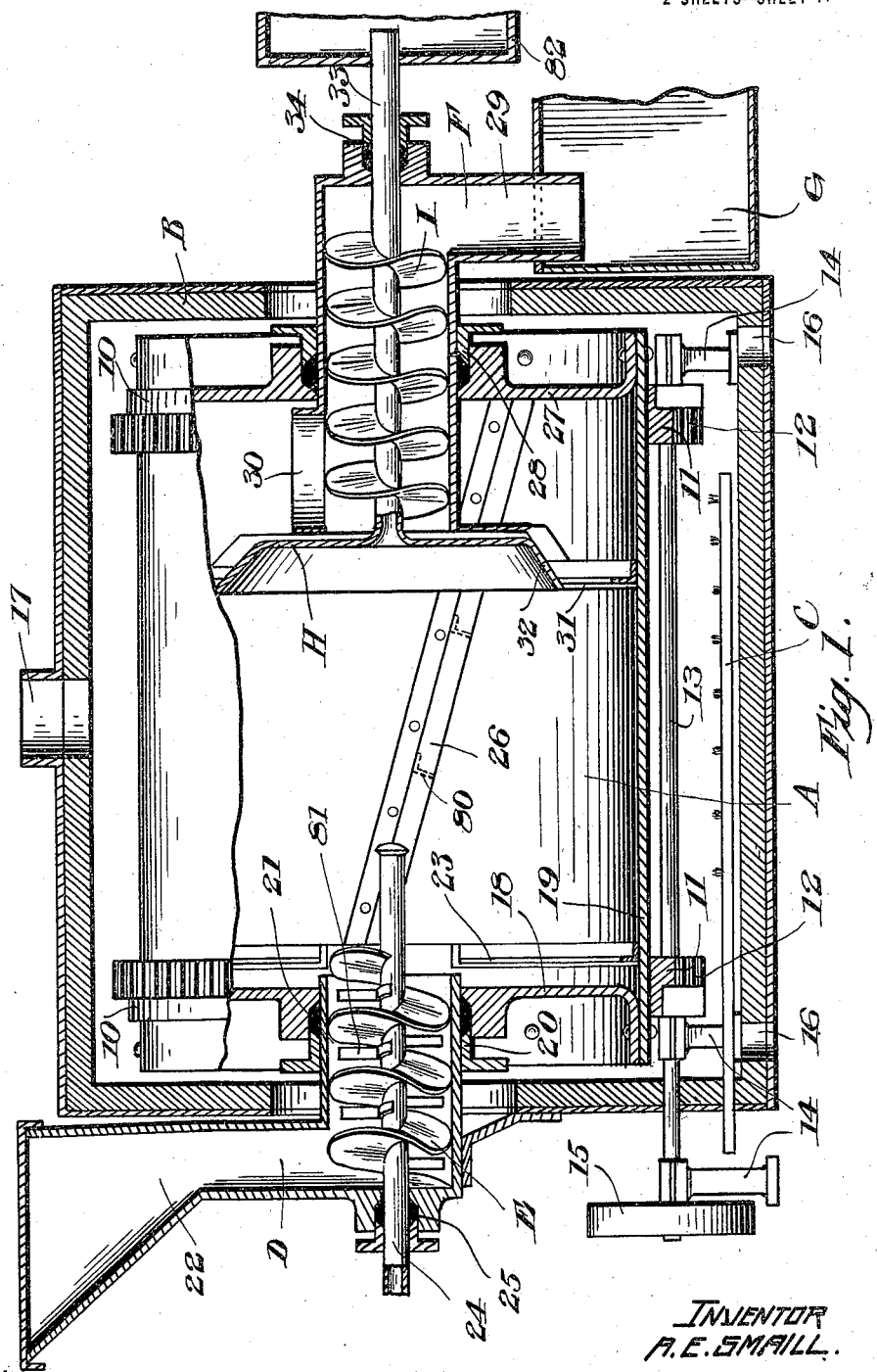
Figure 2:
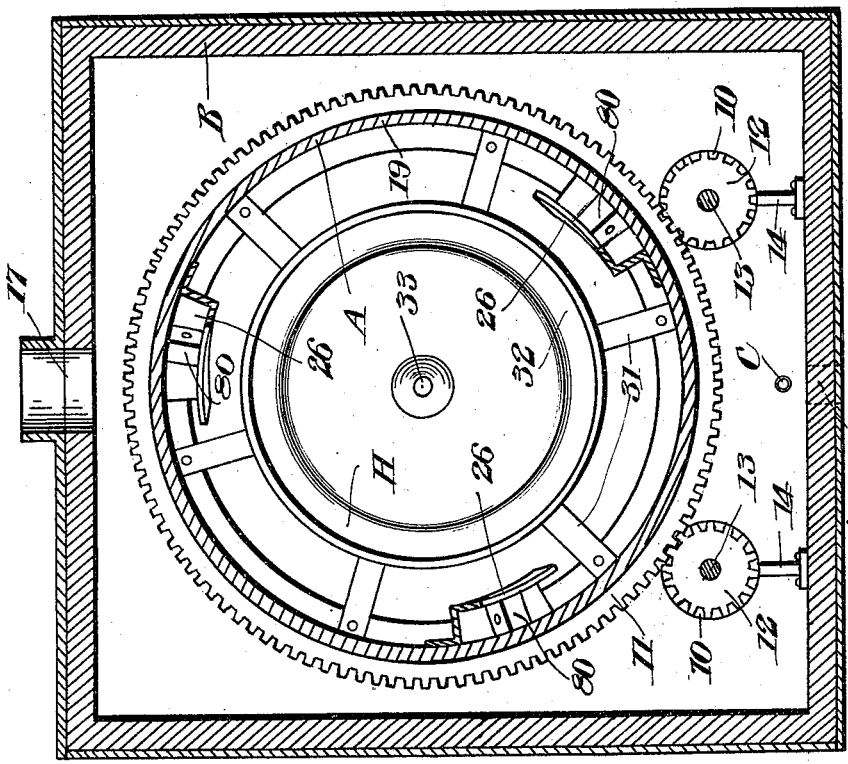

In the drawings, Figure 1 is a longitudinal section through an embodiment of the invention. Fig. 2 is a transverse section.

In the drawings like characters of reference refer to like parts in the several drawings.

Referring to the drawings, A represents a rotary treating chamber conveniently constructed in the form of a steel drum supported on suitable rollers 10. These rollers conveniently engage an annular track 11 on the drum and the turning or rotation of the drum may be accomplished by means of pinions 12 on a shaft 13 supported from suitable brackets 14 and conveniently driven from a pulley 15.

Means are provided for heating the material in the treating chamber and in the embodiment illustrated I have shown a furnace chamber B which surrounds the treating chamber and is provided with a gas burner C beneath the treating chamber supplied with a suitable source of gas supply, the furnace chamber being provided with inlets 16 for air and outlets 17 for the products of combustion.

The material is introduced into the treating chamber through a feeding and mixing tube D which extends through the end 18 of the treating chamber, said end being conveniently flanged and riveted to the peripheral shell 19. A gas tight connection is made between the feeding tube and the end 18 by means of a suitable packing box 20. The feeding tube is provided with a portion 21, the axis of which is coincident with the axis about which the treating chamber turns and an air tight feeding hopper 22 is connected to the portion 21.

The feeding and mixing tube is stationary and to feed and mix the material through it a rotary spiral conveyer E equipped with paddles 81 is provided, connected on the inside to the periphery of the treating chamber by means of a suitable spider 23 and having a hollow core 24 through which liquid, gas, steam or the like may be introduced to treat the material in the chamber, the core passing through the feeding and mixing tube D and being provided with a suitable packing box 25 to make a gas tight connection with the side of the feeding tube.

The material in the drum is adapted to be mixed and fed axially along the same by means of inclined blades 26 in the periphery thereof, said blades being conveniently Z-shaped in cross section as shown and being disposed at an inclination to the axis, pockets being formed by means of L-irons 80 riveted to said Z-bars.

The material is fed from the treating chamber through an outlet neck F, similar in construction to the neck D and extending through the flanged end 27 of the treating chamber having a gas tight connection therewith by means of the packing box 28. The feeding neck is provided with a discharge end 29 extending into a suitable closed container G. The neck F projects into the treating chamber and is formed with an aperture 30 on the upper side into which the material is adapted to fall. A collecting member H is also provided on the interior of the treating chamber in the form of a disk having less diameter than the treating chamber and being connected by braces 31 to the periphery of the treating chamber, the said collecting member having an inclined flanged periphery 32 adapted to deflect the material toward the end of the chamber. The collecting member is connected at its center to the hollow core 33 of a spiral conveyer I. The hollow core 33 extended into suitable condensers and holders 82 provides an outlet for any gases resulting from the reaction within the chamber, and the conveyer turning with the member H and the treating chamber feeds the material through the neck F. A suitable packing box 34 is provided between the neck and the core 33.

It will be seen that the material which it is desired to treat may be passed continuously through the chamber and may be subjected to any desired temperature and treated with any desirable liquid or gaseous reagent. At the same time the gaseous products of the reaction may be withdrawn through the hollow core 33 into suitable condensers and holders and made to serve useful purposes. The air is also excluded at all points.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

The apparatus may be used for treating ores for various reagents. The apparatus might be used, for instance, for treating iron ore to reduce the same.

What I claim as my invention is:

1. An apparatus for treating material comprising a rotary treating chamber, means for heating the same, stationary feeding tubes extending through opposite ends of the chamber having air tight connections therewith, means for feeding material through said tubes in opposite directions and means for turning the chamber.

2. An apparatus for treating material comprising a rotary treating chamber, means for heating the same, stationary feeding tubes extending through opposite ends of the chamber having air tight connections therewith, spiral worms in the feeding tubes for feeding material in opposite directions.

3. An apparatus for treating material comprising a rotary treating chamber, means for heating the same, gas tight means for continuously feeding material into the chamber during rotation, and gas tight means for continuously withdrawing material from the chamber during treatment, means for turning the chamber, inclined feeding blades on the inner periphery of the feeding chamber adapted to feed the material from one end to the other thereof, said blades being Z-shaped in cross section.

4. An apparatus for treating material comprising a rotary treating chamber, means for heating the same, stationary feeding tubes extending through opposite ends of the chamber having a gas tight connection therewith, spiral conveyers operating in said feeding tubes having hollow cores through which gas may be introduced and withdrawn.

5. An apparatus for treating material comprising a rotary drum, stationary feeding necks extending through the opposite ends of the same for introducing and withdrawing material respectively, spiral conveyers mounted in said tubes and connected to the drum whereby they will rotate with the drum, and a disk-shaped connecting member connected to the conveyer operating in the tube through which the material is withdrawn and having an inclined flanged periphery adapted to feed the material into the tube.

In witness whereof I have hereunto set my hand in the presence of two witnesses.

ALBERT EDWARD SMAILL.

Witnesses:
 RUSSEL S. SMART,
 PEARLE M. GARROW.

Copies of this patent may be obtained for five cents each, by addressing the "Commissioner of Patents, Washington, D. C."